(12) United States Patent
Schreiner

(10) Patent No.: US 6,507,291 B1
(45) Date of Patent: Jan. 14, 2003

(54) NAVIGATION DEVICE FOR A VEHICLE

(75) Inventor: Joerg Schreiner, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/171,188

(22) PCT Filed: Feb. 12, 1997

(86) PCT No.: PCT/DE97/00258

§ 371 (c)(1),
(2), (4) Date: Jul. 26, 1999

(87) PCT Pub. No.: WO97/39310

PCT Pub. Date: Oct. 23, 1997

(30) Foreign Application Priority Data

Apr. 16, 1996 (DE) .......................... 196 14 940

(51) Int. Cl.⁷ .............................. G08G 1/123
(52) U.S. Cl. .................. 340/995; 340/990; 340/988; 701/200; 701/201; 701/209
(58) Field of Search ................ 340/995, 990, 340/988; 701/200, 209, 201

(56) References Cited

U.S. PATENT DOCUMENTS

| 5,191,532 A | * | 3/1993 | Moroto et al. ............... 364/449 |
| 5,657,487 A | * | 8/1997 | Doner ......................... 455/456 |
| 6,064,322 A | * | 5/2000 | Ohira ......................... 340/995 |
| 6,064,323 A | * | 5/2000 | Ishii et al. .................... 340/995 |

* cited by examiner

Primary Examiner—Daniel J. Wu
Assistant Examiner—Daniel Previl
(74) Attorney, Agent, or Firm—Kenyon & Kenyon

(57) ABSTRACT

Navigation system for a vehicle having locations (a, o) of different selectable groups stored in memories and having a device for measuring the distance between the selected destination (z) and the locations (a, o) for a selected group, with the ability to call up the locations (a, o) belonging to the selected group as a function of the measured distance from the location (z) and to reproduce them on a reproduction device. A useful selection of the reproduced destinations is obtained by a device for controlling the reproduction of locations (a) whose distance is less than a specific location limit (r).

9 Claims, 1 Drawing Sheet

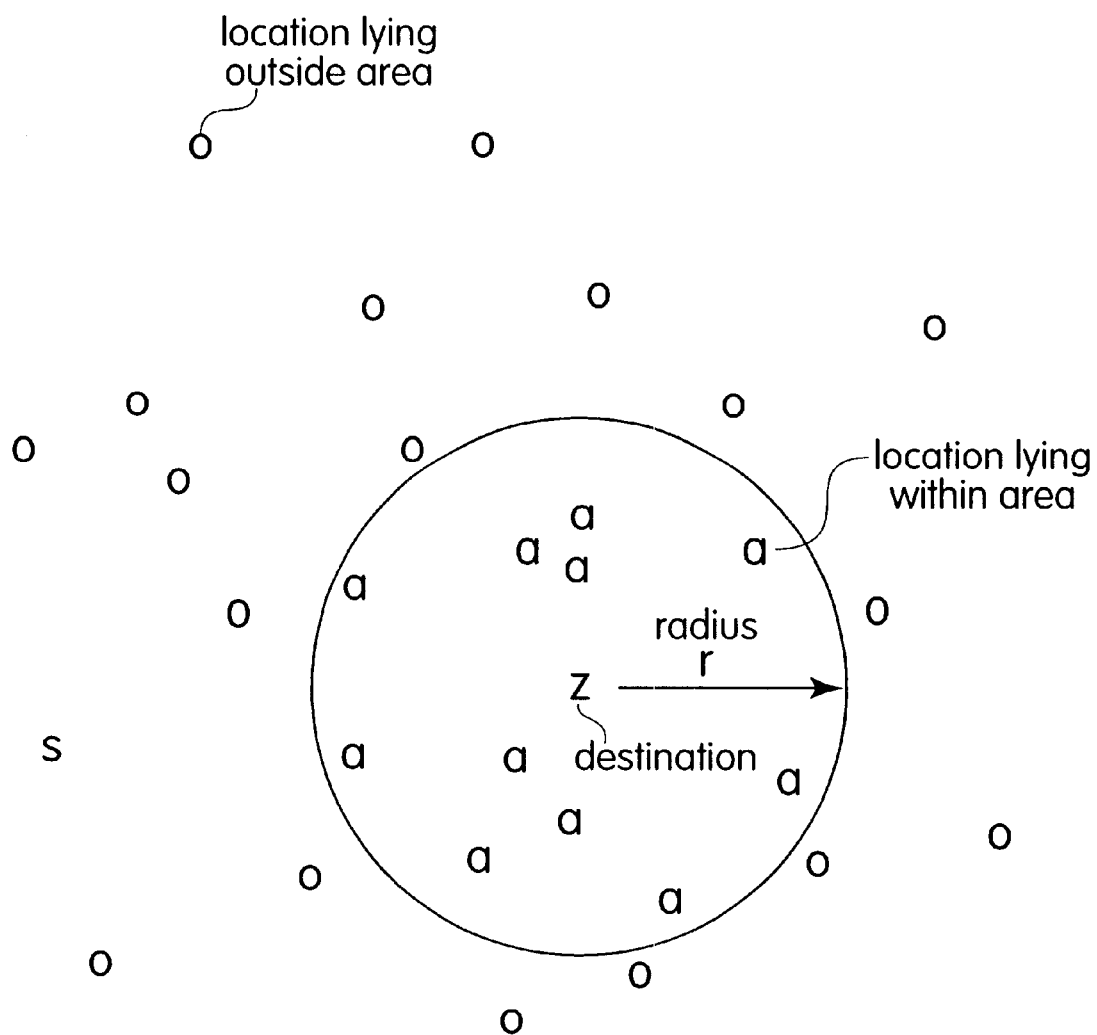
Figure

NAVIGATION DEVICE FOR A VEHICLE

FIELD OF THE INVENTION

The present invention concerns a navigation system for a vehicle having locations of various selectable groups stored in memories and having a device for measuring the distance between the selected destination and the locations for a selected group, with the ability to retrieve the locations belonging to the selected group as a function of the measured distance from the destination and to reproduce it on a reproduction device.

BACKGROUND INFORMATION

Navigation systems are known and are being used increasingly, in particular, in passenger cars in order to make it easier or possible for the driver to locate a destination point at a destination. For this purpose, the navigation systems have road maps stored in electronic form whose individual points can be determined by coordinates. In addition, different groups of locations, which enable a certain destination point to be located as an alternative to coordinate data or street names and numbers, are stored in memories. The different groups of locations can be, for example, hotels, restaurants, parking garages, sports facilities, sites of events, government offices, etc. According to one known navigation system, after calling up one of these groups of locations, the distance between the stored locations and a destination entered by the user is measured, and the ten closest locations for this destination, for example, are output to a screen. One problem with known navigation systems of this type is that the output locations are frequently useless because the distance to the destination is much too great, while in other instances so many locations are stored for a relatively short distance to the destination that selecting the ten closest locations does not provide the driver with sufficient information for the present situation.

SUMMARY OF THE INVENTION

An object of the present invention is to enable locations in a navigation system to be output more reliably.

This object is achieved with a device for controlling the reproduction of locations whose distance is less than a specific distance limit.

According to the present invention, the locations of the selected group lying within a specific distance from the destination are output instead of a fixed number of locations. To do this, a radius around the destination can be defined in the navigation system, identifying the area in which the locations to be reproduced may lie. In this case, the device for measuring the distance is designed for measuring distance along a straight line. The coordinates of the destination and the selected location can be used for measuring the distance.

The distance limit can be preset in the device, but is preferably variable. It can be varied on an individual basis by making an entry. However, automatically applying different distance limits as a function of the currently selected group of locations, which can be useful in individual cases, for example, when comparing the "restaurants" and "hospitals" groups, is also conceivable. As a general rule, it may be useful to have a larger distance limit for hospitals than for restaurants.

BRIEF DESCRIPTION OF THE DRAWING

The FIGURE illustrates the navigation system according to the present invention.

DETAILED DESCRIPTION

The present invention is explained in greater detail below on the basis of one embodiment illustrated schematically in the FIGURE. The letter s designates the position of the vehicle containing the navigation system. Locations assigned to a selected group (hotels, for example) are also shown. The navigation system can be used to select a current navigation destination z.

According to the present invention, a search area is defined by a circle with radius r surrounding destination z as its center point. Locations a lying within the area of this circle are displayed on a display unit, while locations o lying outside this area are not displayed.

The user of the navigation system therefore receives a manageable selection of locations a lying within a specific distance r from destination z.

What is claimed is:

1. A navigation system for a vehicle, comprising:
   a memory for storing locations of at least one selected group of locations;
   a first arrangement for determining distances between, on the one hand, a destination selected by an occupant of the vehicle and, on the other hand, the locations of the at least one selected group;
   a reproduction device; and
   a second arrangement for retrieving from memory at least one particular location of the locations of the at least one selected group stored in memory and for controlling the reproduction device to reproduce the at least one particular location if and only if a determined distance between the selected destination and the at least one particular location is less than a threshold distance value, the threshold distance value varying as a function of the at least one selected group.

2. The navigation system according to claim 1, wherein the reproduction device reproduces all of the locations of the at least one selected group for which determined distances between, on the one hand, the selected destination and, on the other hand, the locations of the at least one selected group are less than the threshold distance value.

3. The navigation system according to claim 1, wherein the reproduction device reproduces all of the locations of the at least one selected group within a circle whose center is the selected destination and whose radius is the threshold distance value, and reproduces none of the locations outside of the circle.

4. The navigation system according to claim 3, wherein the reproduction device is a visual display unit.

5. The navigation system according to claim 1, wherein the reproduction device is a visual display unit.

6. The navigation system according to claim 1, wherein the at least one group of locations is selected by an occupant of the vehicle.

7. The navigation system according to claim 1, wherein the at least one group of locations is selected by an occupant of the vehicle from a plurality of selectable groups of locations stored in the memory.

8. The navigation system according to claim 1, wherein the first arrangement determines the distances along a straight line.

9. The navigation system according to claim 8, wherein the first arrangement determines the distances using coordinates of the selected destination and the locations.

* * * * *